(12) United States Patent
Rakshit (10) Patent No.: US 11,173,666 B2
(45) Date of Patent: Nov. 16, 2021

(54) ADDITIVE MANUFACTURING OF DEFORMABLE OBJECTS

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 16/599,476

(22) Filed: Oct. 11, 2019

(65) Prior Publication Data

US 2021/0107230 A1  Apr. 15, 2021

(51) Int. Cl.

| B29C 64/393 | (2017.01) |
| G06N 20/00 | (2019.01) |
| B33Y 50/02 | (2015.01) |
| B33Y 30/00 | (2015.01) |
| B33Y 70/00 | (2020.01) |

(Continued)

(52) U.S. Cl.
CPC .......... B29C 64/393 (2017.08); B29C 64/20 (2017.08); B29C 64/364 (2017.08); B33Y 30/00 (2014.12); B33Y 40/00 (2014.12); B33Y 50/02 (2014.12); B33Y 70/00 (2014.12); G06N 20/00 (2019.01); G06T 7/001 (2013.01); B29K 2001/00 (2013.01); B29K 2105/0061 (2013.01);

(Continued)

(58) Field of Classification Search
CPC ..... B29C 64/393; B29C 64/364; B29C 64/20; B33Y 30/00; B33Y 40/00; B33Y 50/02; B33Y 70/00; G06N 20/00; G06T 7/001; G06T 2207/10016; G06T 2207/30144; B29K 2001/00; B29K 2105/0061
See application file for complete search history.

(56) References Cited

U.S. PATENT DOCUMENTS 10,399,327 B2 * 9/2019 Bacher .................. B29C 64/393
10,769,848 B1 * 9/2020 Wang .................... B29C 64/386
(Continued)

FOREIGN PATENT DOCUMENTS

| CN | 105824978 A | 8/2016 |
| KR | 1020130049391 A | 5/2013 |
| KR | 101911856 B1 | 10/2018 |

OTHER PUBLICATIONS

Zafar et al., 4D Printing: Future Insight in Additive Manufacturing, Metals and Materials International, vol. 26, pp. 564-585 (2020), Sep. 17, 2019 (Year: 2019).*

(Continued)

*Primary Examiner* — Yung-Sheng M Tsui
*Assistant Examiner* — Melody Tsui
(74) *Attorney, Agent, or Firm* — Stosch Sabo (57) ABSTRACT

Described are techniques for additive manufacturing of deformable objects. The techniques including a method comprising generating printing parameters for a deformable component. The method further comprises fabricating the deformable component by additive manufacturing, where a smart material is located at an articulation point of the deformable component, and where a base material is located at a static portion of the deformable component. The method further comprises supplying an environmental stimulus to the deformable component that causes the deformable component to transition from a first state to a second state.

7 Claims, 4 Drawing Sheets

(51) Int. Cl.
  *B33Y 40/00* (2020.01)
  *B29C 64/20* (2017.01)
  *G06T 7/00* (2017.01)
  *B29C 64/364* (2017.01)
  *B29K 1/00* (2006.01)
  *B29K 105/00* (2006.01)

(52) U.S. Cl.
  CPC .............. *G06T 2207/10016* (2013.01); *G06T 2207/30144* (2013.01)

(56) References Cited

U.S. PATENT DOCUMENTS

| | | | | |
|---|---|---|---|---|
| 2017/0358133 | A1* | 12/2017 | Iverson | G06T 3/403 |
| 2018/0078347 | A1* | 3/2018 | Falkel | A61B 5/0088 |
| 2019/0167934 | A1* | 6/2019 | Lucey | G06T 15/205 |
| 2020/0316847 | A1* | 10/2020 | Tibbits | B29C 61/003 |

OTHER PUBLICATIONS

Berger, M., "Material systems used in 4D printing", nanowerk, Jan. 31, 2019, 10 pages <https://www.nanowerk.com/spotlight/spotid-52023.php>.

Wikipedia, "Smart material", From Wikipedia, the free encyclopedia, last edited on Jun. 6, 2019, 2 pages <https://en.wikipedia.org/wiki/Smart_material>.

Wikipedia, "Linkage (mechanical)", From Wikipedia, the free encyclopedia, last edited on Jun. 8, 2019, 11 pages <https://en.wikipedia.org/wiki/Linkage_(mechanical)>.

O'Neal, B., "Embryo 3D: Expectant Parents in Russia Hold 3D Printed Likenesses of Their Babies", Mar. 22, 2018, 5 pages, <https://3dprint.com/207320/embryo-3d-printed-babies/>.

* cited by examiner

ADDITIVE MANUFACTURING OF DEFORMABLE OBJECTS

BACKGROUND

The present disclosure relates to additive manufacturing, and, more specifically, to four-dimensional (4D) printing of deformable objects.

Additive manufacturing includes manufacturing techniques such as three-dimensional (3D) printing. In 3D printing, material is deposited layer-by-layer to create a component. 3D printing can be useful in applications such as prototype manufacturing and custom manufacturing of any number of parts. Further, 3D printing can be useful in applications requiring unique, delicate, complex, and/or interior geometries that are more efficient to manufacture using 3D printing than other manufacturing techniques. An extension of 3D printing is 4D printing. 4D printing can create objects that transform over time as a result of a stimulus. 4D printing can be useful for similar applications as 3D printing. Furthermore, 4D printing can also be useful for fabricating multifunctional parts and/or moving parts.

SUMMARY

Aspects of the present disclosure are directed toward a method comprising generating printing parameters for a deformable component. The method further comprises fabricating the deformable component by additive manufacturing, where a smart material is located at an articulation point of the deformable component, and where a base material is located at a static portion of the deformable component. The method further comprises supplying an environmental stimulus to the deformable component that causes the deformable component to transition from a first state to a second state.

Additional aspects of the present disclosure are directed to systems and computer program products configured to perform the method described above.

Additional aspects of the present disclosure are directed to a four-dimensional printer comprising a platform, a nozzle, and a deformation unit. The nozzle is configured to fabricate a deformable component on the platform according to printing parameters and using a smart material and a base material, where the smart material is located at an articulation point of the deformable component, and where the base material is located at a static portion of the deformable component. The deformation unit is configured to apply an environmental stimulus to the deformable component that is configured to cause the deformable component to transition from a first state to a second state.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward additive manufacturing, and, more specifically, to four-dimensional (4D) printing of deformable objects. While not limited to such applications, embodiments of the present disclosure may be better understood in light of the aforementioned context.

Additive manufacturing (also referred to as three-dimensional (3D) printing) involves receiving a computer-aided design (CAD) model, parsing the CAD model into numerous layers, and then printing each layer sequentially to physically manufacture a component based on the CAD model. The printing can function by any number of techniques and processes that are configured to fuse, join, or otherwise combine material. For example, 3D printing can be performed by vat photopolymerization, material jetting, binder jetting, powder bed fusion, material extrusion, directed energy deposition, sheet lamination, fused filament deposition (FFD), and/or other 3D printing techniques.

A variety of materials can be used in manufacturing. These materials can include thermoplastics that are heated to a flowing point, deposited according to the layer-by-layer deposition protocol, and allowed to cool to solidify and bind with any adjacent material. In some situations, multiple materials are used, or similar materials are used with different modifiers for color, strength, conductivity, chemical resistance, and/or other aesthetic, structural, electrical, chemical, or biological properties.

4D printing can use one or more smart materials to create objects that undergo transformations when exposed to an appropriate environmental stimulus. The smart materials can be referred to as programmatic materials insofar as they exhibit a predictable physical response to certain stimuli. For example, a smart material may naturally contract, shrink, expand, fold, contort, twist, or revert to a predetermined state when exposed to a stimulus such as moisture, temperature, electricity, magnetism, or a different stimulus. Smart materials can be incorporated into objects fabricated by 3D printing to create 4D objects that transform over a period of time and in response to an environmental stimulus. In some embodiments, the smart materials can be distributed throughout the objects. In other embodiments, the smart materials are incorporated into articulation points (e.g., hinges, joints, etc.).

Aspects of the present disclosure are directed to a 4D printer for fabricating 4D objects using one or more smart materials. Further aspects of the present disclosure are directed to a machine learning model for generating printing parameters for fabricating 4D objects from video of objects that change shape over time.

Figure 1:
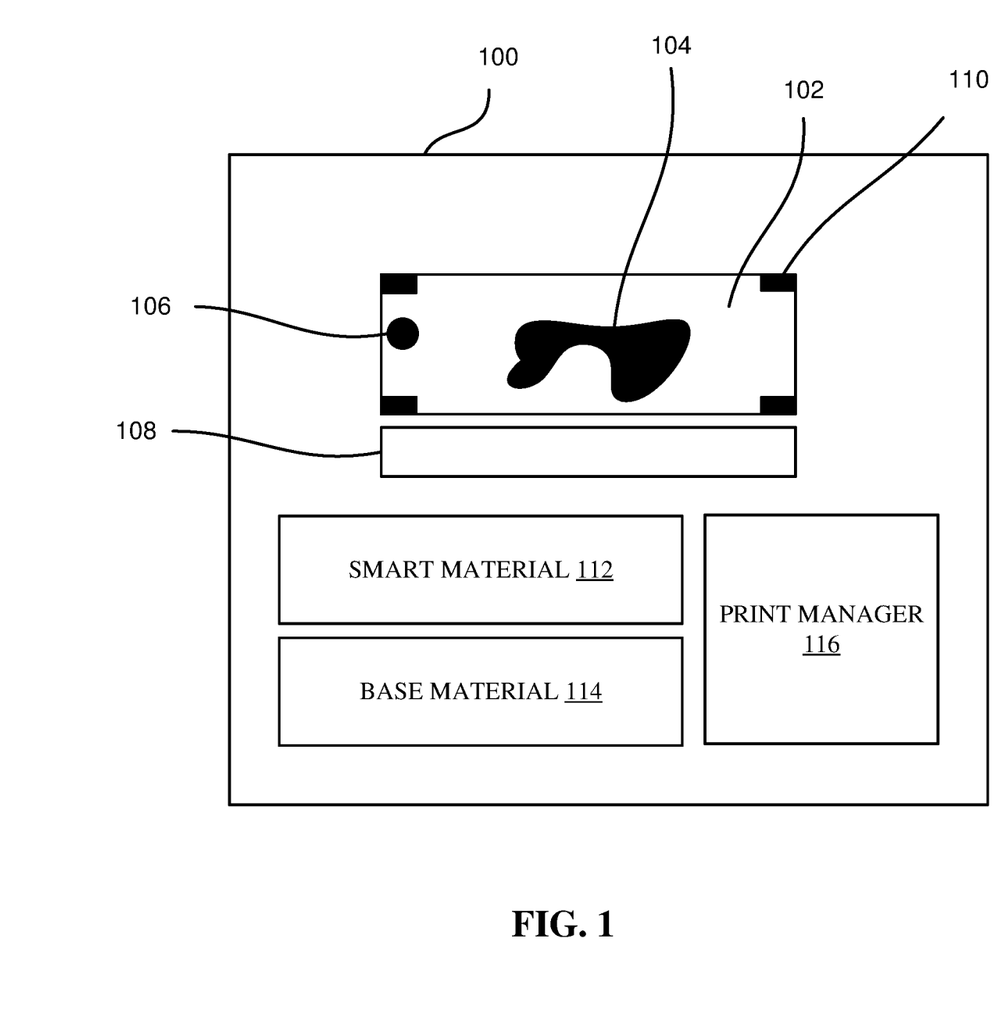
FIG. 1 illustrates a block diagram of an example four-dimensional (4D) printer configured to print a deformable component, in accordance with some embodiments of the present disclosure.

Referring now to the figures, FIG. 1 illustrates a block diagram of a top view of an example 4D printer 100, in accordance with some embodiments of the present disclosure. 4D printer 100 includes a platform 102 upon which a deformable component 104 is fabricated using layer-by-layer deposition of a material from a nozzle 106. The nozzle 106 can be configured to deposit the material at a predetermined feed rate using an orifice of predetermined size and geometry together with a predetermined backpressure and a predetermined nozzle temperature. The nozzle 106 can articulate in three dimensions using, for example, a ball-and-socket where the nozzle 106 is attached by an extendable and retractable arm and may move about platform 102 in all three dimensions. In another example, the nozzle 106 can move in three dimensions using a track system whereby, for example, the track moves forward and backward in the y-direction, the nozzle 106 traverses the track in the x-direction, and the track extends and retracts in the z-direction (or the platform 102 extends and retracts in the z-direction). These are only examples of nozzle 106, and nozzle 106 can include any nozzle architecture and articulating apparatus now known or later developed.

The material deposited by the nozzle 106 can include a smart material 112. Smart material 112 can refer to any material that transforms over a period of time in response to one or more stimuli. For example, a smart material 112 can change from a first geometry, orientation, and/or state to a second geometry, orientation, and/or state as a result of a stimulus. Here, the differences between a first state and a second state can relate to one or more of (1) changes in dimensions (e.g., expand, contract, elongate, shrink, etc.), (2) changes in properties (e.g., changes in weight, conductivity, magnetism, color, transparency, etc.), (3) changes in orientation (e.g., folded, unfolded, etc.), and/or other changes.

One example of a smart material 112 is a hydrogel. Hydrogels are made up of a network of cross-linked polymer chains that are hydrophilic. Hydrogels can absorb many times their weight in water. In some cases, hydrogels expand and contract as a function of an amount of absorbed liquid. Hydrogels that expand and contract can be useful for creating a deformable component 104.

Another example of a smart material 112 is a cellulose-based material with a configurable reaction to relative humidity. For example, cellulose-based materials (e.g., a composite including a cellulose-based material) can be hydrophilic or hydrophobic, and when incorporated into a deformable component 104, the cellulose-based material can swell a predetermined amount according to the relative humidity in the vicinity of the deformable component 104.

Another example of a smart material 112 is a thermo-responsive material such as thermo-reactive polymers or thermo-reactive hydrogels. An example of a thermo-responsive material is poly(N-isopropylacrylamide) (pNIPAM) which has a critical solution temperature above which it dehydrates and shrinks and below which it absorbs and expands.

Another example of a smart material 112 is a shape memory polymer (SMP). SMPs can retain two or more shapes, where the transition between those two or more shapes is induced by temperature, electrical current, a magnetic field, light, or a solution. When temperature is the stimulus, SMPs can have a temporary form that is triggered by temperatures below the glass transition temperature and a permanent form triggered by temperatures above the glass transition temperature (or vice versa). SMPs can include polyurethanes with ionic or mesogenic components manufactured using the prepolymer method. SMPs can also include block copolymers such as, but not limited to, (1) polyethylene terephthalate (PET) with polytheyleneoxide (PEO), (2) polystyrene with poly(1,4-butadiene), and/or (3) poly(2-methyl-2-oxazoline) with polytetrahydrofuran.

Another example of a smart material 112 is a liquid crystal elastomer (LCE). LCEs are mildly crosslinked liquid crystalline polymer networks. LCEs can realize reversible shape changes whereas some other smart materials 112 may only undergo a single, permanent transition.

Regardless of the type of smart material 112 used, the smart material 112 can be incorporated into points of deformation in the deformable component 104. In other words, the smart material 112 can be located at least at hinges, joints, and/or other articulation points in the deformable component 104. Nonetheless, in some embodiments, the smart material 112 is distributed throughout the entirety of the deformable component 104.

The material deposited by the nozzle 106 can further include a base material 114. The base material 114 can include any type of material suitable for additive manufacturing. Some non-limiting examples of base material 114 can include acrylonitrile butadiene styrene (ABS), thermoplastic elastomers (TPEs), thermoplastic urethanes (TPUs), poly-lactic acid (PLA), polystyrene (PS), high-impact polystyrene (HIPS), polyethylene (PE), polyethylene terephthalate (PET), polyethylene terephthalate glycol-modified (PETG), polypropylene (PP), nylon, acrylonitrile styrene acrylate (ASA), polycarbonate (PC), polyvinyl alcohol (PVA), and others. The base material 114 can be used in portions of the deformable component 104 that generally retain a static state during deformation. In other words, static portions of the deformable component 104 can move between states, but they are not the cause of the movement. Rather, smart materials 112 in articulating portions of the deformable component 104 can cause changes in orientation or position of base materials 114 in static portions of the deformable component 104.

In some embodiments, either or each of smart material 112 and base material 114 can include a combination of two or more materials (e.g., a composite, a polymer blend, etc.). Although not explicitly shown, either or each of smart material 112 and base material 114 can include any number of additives useful for improving processability, improving longevity, or improving mechanical, electrical, or temperature properties. For example, either or each of smart material 112 and base material 114 can include plasticizers, nucleating agents, desiccants, impact modifiers, chain extenders, stabilizers, carboxyl scavengers, fillers (e.g., mineral, wood, metal, aramid, carbon, graphite, etc.), and the like.

4D printer 100 can further include a deformation unit 108 for generating an appropriate environmental stimulus to cause deformation in the deformable component 104. The deformation unit 108 can be configured to manage one or more properties of: temperature (including rate of change between temperatures and/or dwell times at preset temperatures), relative humidity, moisture content, light (including wavelength, frequency, and/or intensity), magnetism (e.g., a magnetic field), electrical properties (e.g., current, voltage, resistance, etc.), and/or other properties. In some embodiments, the deformation unit 108 can be configured to cycle between different levels or types of stimuli in order to induce vibrations, pulses, or other cyclic characteristics in the deformable component 104.

When the environmental stimulus is moisture, the deformation unit 108 can include a solution bath, a mister, or a different mechanism for providing moisture to the deformable component 104. When the environmental stimulus is temperature, the deformation unit 108 can include one or more of a heating element, a cooling element, a circulator for evenly maintaining a given temperature (e.g., a fan, a blower, a reflector, etc.), and/or a thermometer for monitoring the temperature. When the environmental stimulus is light, the deformation unit 108 can include one or more bulbs with tailorable wavelength, frequency, and/or intensity. When the environmental stimulus is magnetism, the deformation unit 108 can include one or more inductors with tailorable magnetic properties. When the environmental stimulus is relative humidity, the deformation unit 108 can include one or more of a humidifier, a dehumidifier, and/or a psychrometer or hygrometer for measuring relative humidity. The aforementioned is a non-limiting list of example deformation units 108, however, other deformation units configured to provide similar or different environmental stimuli are also possible and within the spirit and scope of the present disclosure. Further, there can also be multifunctional deformation units 108 for generating two or more environmental stimuli.

4D printer 100 further includes one or more video cameras 110 proximate to the platform 102 for monitoring deformation of the deformable component 104. The cameras 110 can be configured to record a video of the deformable component 104 undergoing deformation. The recorded video can be uploaded to a print manager 116 for quantifying accuracy of the fabricated deformable component 104 relative to an initial video used to generate the printing parameters for the deformable component 104. Although four cameras 110 are shown in corners of platform 102, more or fewer cameras 110 in similar or different locations fall within the spirit and scope of the present disclosure.

4D printer 100 further includes print manager 116. Print manager 116 can be a combination of hardware and software configured to control nozzle 106 for printing deformable component 104 by additive manufacturing using one or more of smart materials 112 and/or base materials 114. Print manager 116 can be configured to generate printing parameters for fabricating the deformable component 104 and stimulus parameters for causing deformation in the deformable component 104 using the deformation unit 108.

Deformable component 104 is shown purely for illustrative purposes and can include any number of geometries to function in any number of applications associated with a variety of industries. Although not explicitly shown in FIG. 1, deformable component 104 can include one or more articulation points such as hinges, joints, or otherwise. Smart material 112 can be strategically placed at these articulation points for enabling the deformable component 104 to transition from a first state to a second state.

FIG. 1 is shown purely for illustrative purposes, and embodiments exist that can include more or fewer components than the components specifically shown in FIG. 1. Furthermore, the components shown in FIG. 1 can be arranged in different configurations than the configuration shown, and some components can be distant from the 4D printer 100 rather than incorporated into the 4D printer 100 while remaining within the spirit and scope of the present disclosure.

Figure 2:
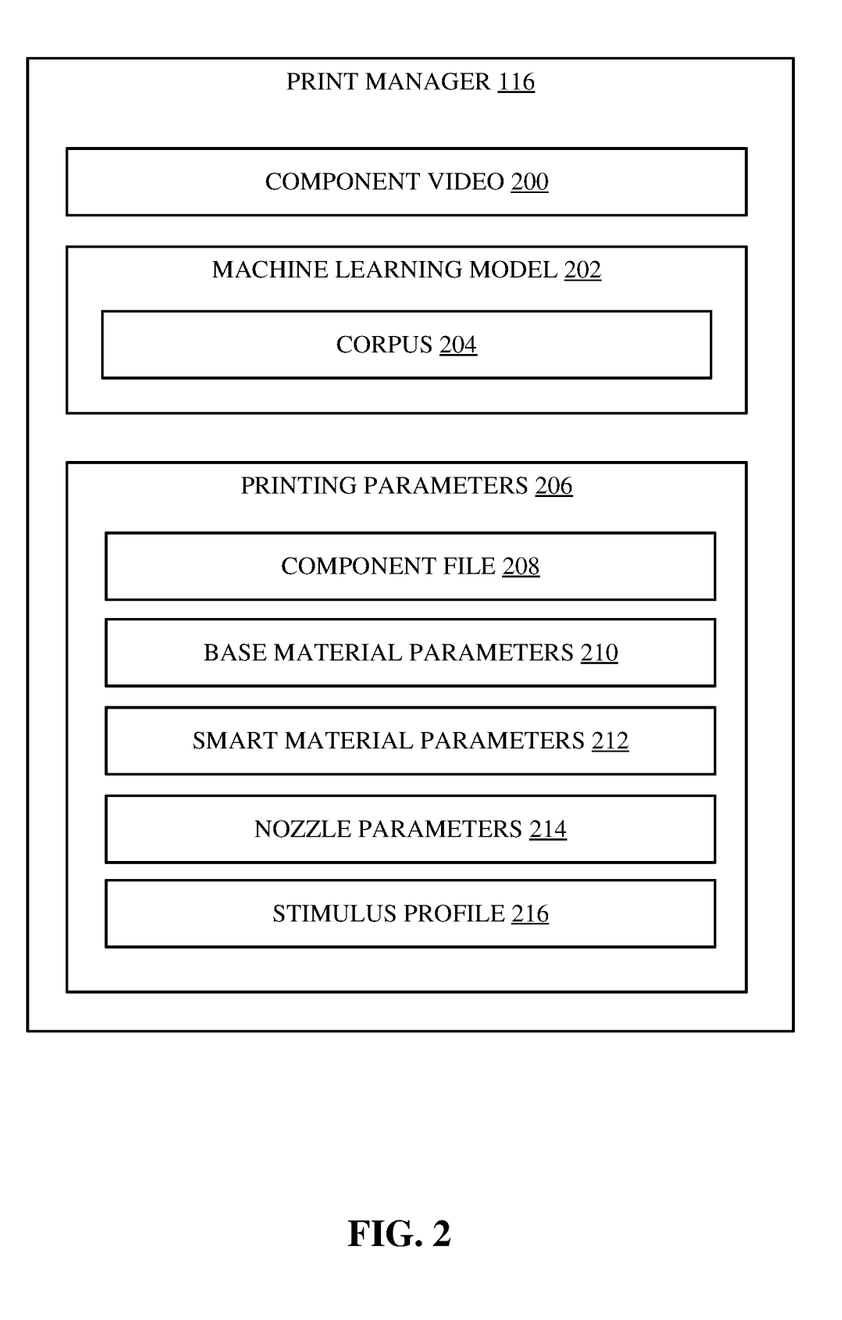
FIG. 2 illustrates a block diagram of an example print manager of a 4D printer, in accordance with some embodiments of the present disclosure.

FIG. 2 illustrates an example of print manager 116, in accordance with some embodiments of the present disclosure. Print manager 116 can include a component video 200 illustrating an object undergoing deformation. Aspects of the present disclosure are directed to ingesting the component video 200 and generating printing parameters 206 for fabricating a deformable component 104 that is consistent with the geometry of the object in the component video 200 and capable of approximating the deformation shown in the component video 200.

The component video 200 can be any video of any object. For example, in a healthcare setting, the component video 200 can be an ultrasound video of a heart beating. In this example, the deformable component 104 fabricated by the 4D printer 100 can replicate a beating heart and can be useful for training doctors and/or allowing surgeons to practice surgeries on a realistic representation of an organ.

In a design setting, the component video 200 can be a video of a leaf unfolding. In this example, the deformable component 104 fabricated by the 4D printer 100 can be configured to replicate the unfolding of the leaf as an educational tool, a toy, or for aesthetic purposes.

These are but two non-limiting examples provided to illustrate the breadth of applications to which various embodiments of the present disclosure can be applied. Further, the component video 200 is not necessary, and embodiments of the present disclosure exist that can generate a deformable component 104 that is not an approximation of an object undergoing deformation from a video.

Print manager 116 can further include a machine learning model 202 having a corpus 204. The corpus 204 can include a compilation of videos and design files for previously fabricated 4D printed objects. The corpus 204 can include, for example, one or more of a video of a 4D printed object transforming from a first state to a second state, a design file containing the dimensions and geometries of the 4D printed object, material data for various portions of the 4D printed object, processing parameters (e.g., nozzle temperature, backpressure, feed rate, etc.), and/or other properties related to the 4D printed object.

Machine learning model 202 can ingest corpus 204 to generate insights, algorithms, and/or predictions related to 4D component fabrication. Machine learning model 202 can be configured to receive the component video 200, analyze it, and output printing parameters 206 for fabricating a deformable component 104 replicating an object undergoing deformation in the component video 200.

Machine learning model 202 can utilize machine learning and/or deep learning, where algorithms or models can be generated by performing supervised, unsupervised, or semi-supervised training on the corpus 204, and subsequently applying the generated algorithm or model to a component video 200 for generating printing parameters 206. Thus, machine learning model 202 can include visual techniques and technology for extracting useful information from component video 200. For example, machine learning model 202 can include capability for image classification (e.g., object recognition, object detection, pose estimation, shape recognition technology (SRT), and the like), motion analysis (e.g., egomotion, object tracking, optical flow), semantic segmentation, instance segmentation, scene reconstruction, and the like.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Print manager 116 can further include printing parameters 206 including a component file 208, base material parameters 210, smart material parameters 212, nozzle parameters 214, and/or a stimulus profile 216. The component file 208 can be, for example, a CAD model of the deformable component 104 that approximates an object shown in component video 200 and that is stored in, for example, a stereolithography (STL) file format. Component file 208 can include information related to dimensions, tolerances, features, materials, and the like as they relate to the deformable component 104. The component file 208 can also include information related to states and transitions between states.

Base material parameters 210 and smart material parameters 212 identify one or more of: a material type (e.g., a type of base material 114 and/or smart material 112), a material weight (or volume), material processing characteristics (e.g., filament diameter, cure profile, etc.), material purchasing information (e.g., hyperlinks to suppliers of the identified materials), a material melting point, a material glass transition temperature, a rheological profile of the material (e.g., viscosity, viscosity as a function of shear rate, etc.), a material elasticity profile as a function of temperature, and the like.

Nozzle parameters 214 can include, but are not limited to, a nozzle temperature, a filament feed-rate, an angle of deposition, a backpressure, an orifice geometry, and the like.

Further, the nozzle parameters 214 can include a travel pattern and travel speed for fabricating each layer of the deformable component 104.

The stimulus profile 216 can quantify the stimulus needed for transforming the deformable component 104 from a first state to a second state. The stimulus profile 216 can include a type of stimulus, a duration of the stimulus, and a rate of change of the stimulus. For example, for a stimulus profile utilizing temperature, electrical current, light, relative humidity, or other factors, a stimulus profile 216 can include (1) a first stimulus state, (2) a dwell time at the first stimulus state, (3) a transition profile from the first stimulus state to a second stimulus state, (4) a dwell time at the second stimulus state, and (5) a transition profile form the second stimulus state to the first stimulus state. As one non-limiting example, when the stimulus profile 216 includes temperature, the stimulus profile 216 can include one or more of: a first temperature, a first dwell time at the first temperature, a rate of change between the first temperature to a second temperature, a second dwell time at the second temperature, and/or a second rate of change from the second temperature to the first temperature. This non-limiting example can be similarly applied to other types of stimuli such as, for example, relative humidity, an electrical current, a magnetic field, irradiation, and the like. Further, the stimulus profile 216 can include simultaneously implementing multiple stimuli such as variations in temperature and relative humidity, or variations in light and electrical currents, and so on. This may be useful for complex deformable components 104 including a variety of smart materials 112. Further still, the stimulus profile 216 can relate to binary parameters such as not immersed in a liquid or immersed in a liquid.

In some embodiments, the stimulus profile 216 is stored as a software program that can be executed by the deformation unit 108. In some embodiments, the deformation unit 108 can be configured to execute the stimulus profile 216 during fabrication of the deformable component 104 to facilitate fabrication of the deformable component 104 and/or to verify accuracy of the deformable component 104.

FIG. 2 is shown purely for illustrative purposes, and embodiments exist that can include more or fewer components than the components specifically shown in FIG. 2. Furthermore, the components shown in FIG. 2 can be arranged in different configurations than the configuration shown, and some components can be distant from the printer manager 116 rather than incorporated into the printer manager 116 while remaining within the spirit and scope of the present disclosure.

Figure 3:
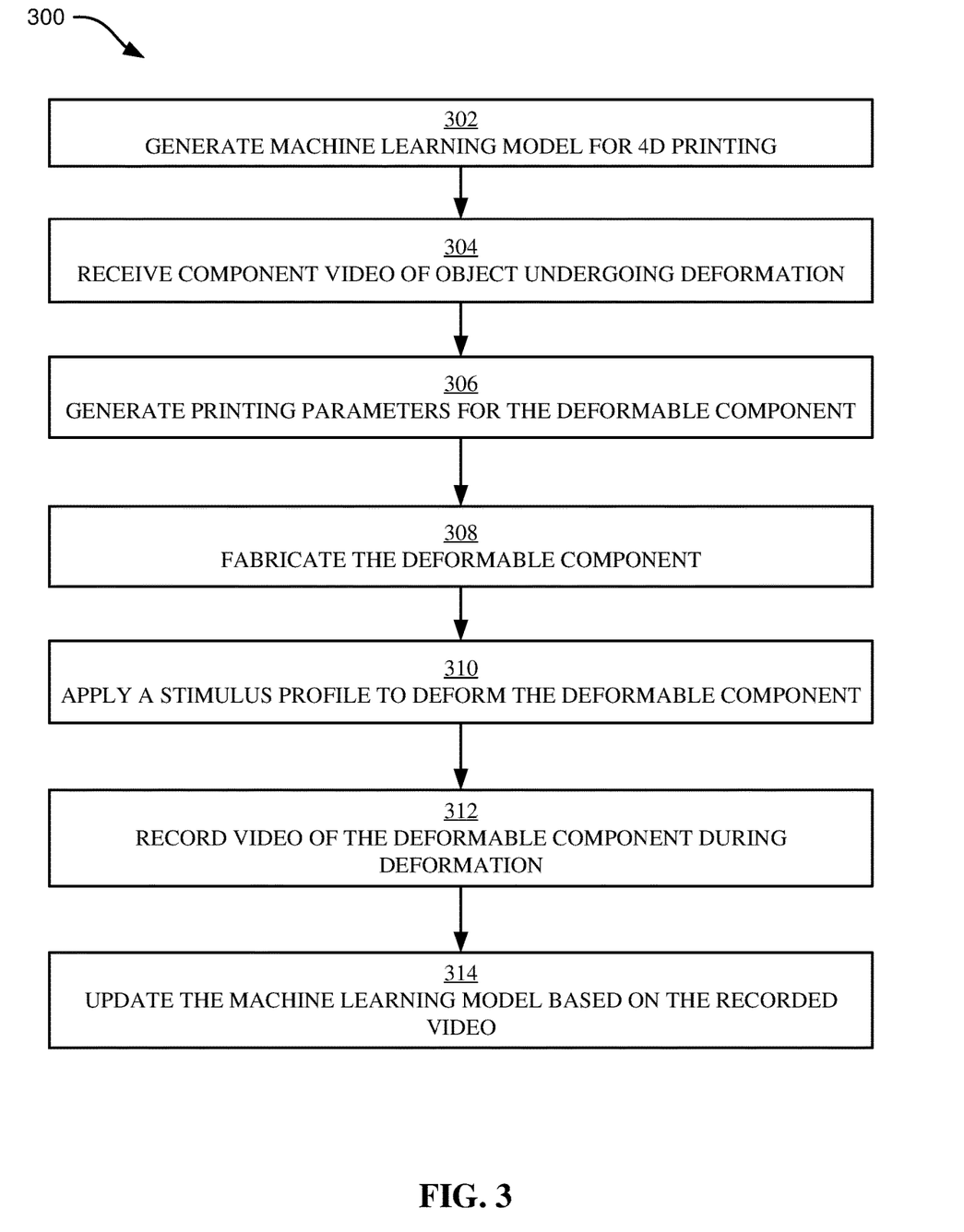
FIG. 3 illustrates a flowchart of an example method for fabricating a deformable component using additive manufacturing, in accordance with some embodiments of the present disclosure.

FIG. 3 illustrates a flowchart of an example method 300 for fabricating a deformable component 104, in accordance with some embodiments of the present disclosure. The method 300 can be performed by, for example, a 4D printer 100, a print manager 116, or a different configuration of hardware and/or software.

Operation 302 includes generating a machine learning model 202 for 4D printing. Machine learning model 202 can be generated using any one or more of the techniques previously discussed with respect to FIG. 2. In some embodiments, the machine learning model 202 is hosted on a server that is communicatively coupled to the 4D printer 100 or the print manager 116 via a network.

Operation 304 includes receiving a component video 200 of an object undergoing deformation. The component video 200 can be received from the Internet, a personal area network (PAN), a transportable storage medium (e.g., a universal serial bus (USB) drive), or by another mechanism.

Operation 306 includes generating printing parameters 206 for printing a deformable component 104 that approximates the object undergoing deformation shown in the component video 200. The printing parameters 206 can be generated by inputting the component video 200 into the machine learning model 202. In some embodiments, the printing parameters 206 include one or more of a component file 208, base material parameters 210, smart material parameters 212, nozzle parameters 214, and/or a stimulus profile 216.

Operation 308 includes fabricating the deformable component 104 using additive manufacturing. Fabricating the deformable component 104 includes sending the printing parameters 206 to the 4D printer 100, where the 4D printer 100 reads the printing parameters 206 and prints the deformable component 104 according to the printing parameters 206. Operation 308 can include depositing a smart material 112 at least at articulating portions of the deformable component 104 and depositing base material 114 at static portions of the deformable component 104.

In some embodiments, operation 308 further includes implementing the stimulus profile 216 by the deformation unit 108 during the fabrication of the deformable component 104. Executing the stimulus profile 216 during fabrication can facilitate fabrication of the deformable component 104 and/or verify accuracy of the deformable component 104 at various stages of fabrication.

Operation 310 includes applying an environmental stimulus to the deformable component 104 using a deformation unit 108. The environmental stimulus can be, for example, a temperature profile, a relative humidity profile, a moisture profile, a spectral profile, an electrical profile, a magnetic profile, another profile, or a combination of two or more of the aforementioned profiles. The deformation unit 108 can apply the stimulus according to pattern such as (1) a first stimulus state, (2) a dwell time at the first stimulus state, (3) a transition profile from the first stimulus state to a second stimulus state, (4) a dwell time at the second stimulus state, and/or (5) a transition profile from the second stimulus state to the first stimulus state. In the aforementioned example, the deformable component 104 can change from a first state in the first stimulus state to a second state in the second stimulus state.

Operation 312 includes recording a video of the deformable component 104 using one or more cameras 110. The recorded video can capture the deformable component 104 transitioning from the first state to the second state in response to receiving the stimulus from the deformation unit 108.

Operation 314 includes updating the machine learning model 202 according to the recorded video generated in operation 312. Updating the machine learning model 202 can be useful for improving the accuracy of the machine learning model 202. Operation 314 can include retraining the machine learning model 202 with the recorded video included in the corpus 204.

The aforementioned operations can be completed in any order and are not limited to those described. Additionally, some, all, or none of the aforementioned operations can be completed, while still remaining within the spirit and scope of the present disclosure.

Figure 4:
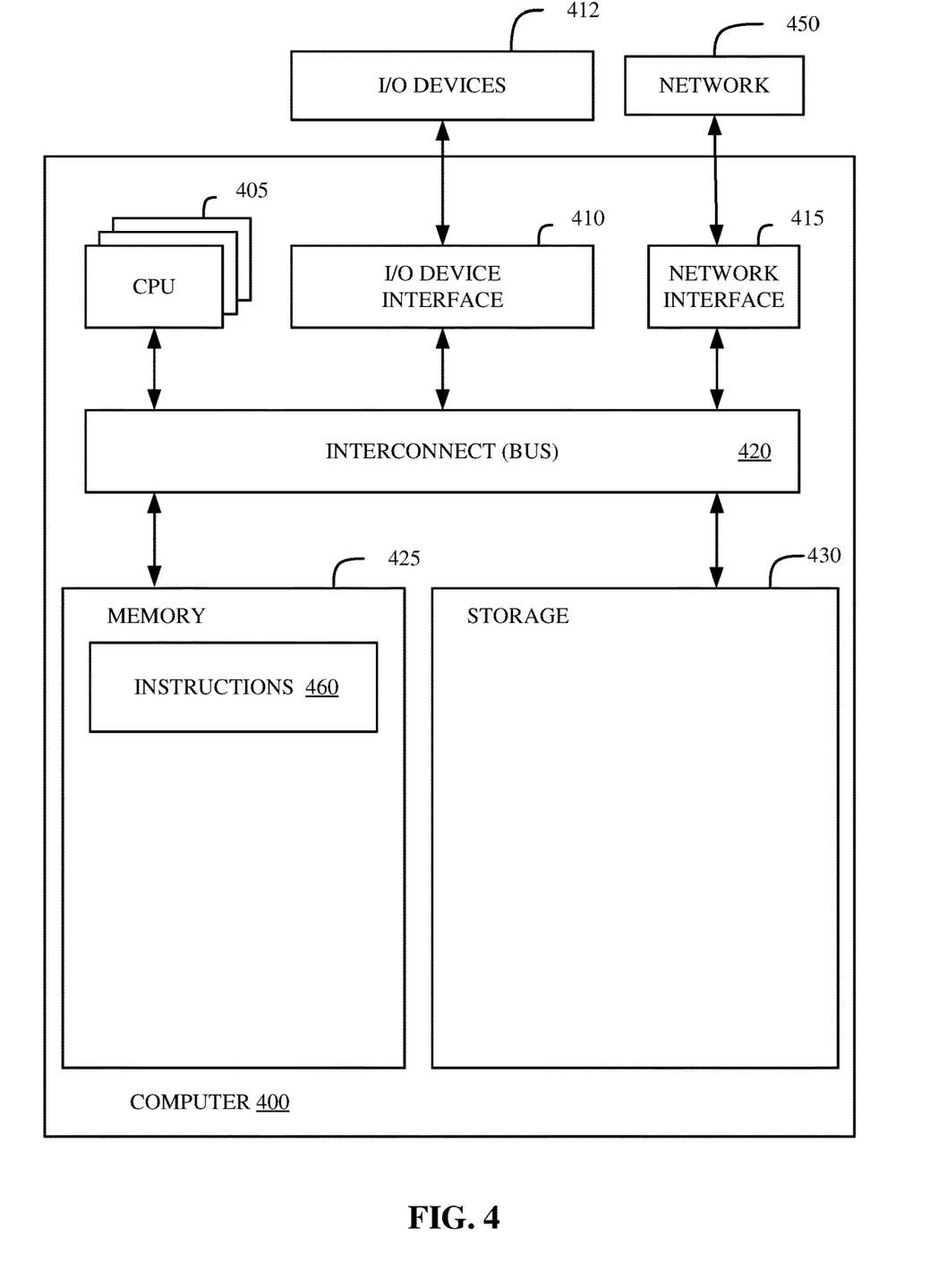
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform the methods described in FIG. 3 and/or implement the functionality discussed in FIGS. 1-2. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into the 4D printer 100 and/or the print manager 116.

Computer 400 includes memory 425, storage 430, interconnect 420 (e.g., BUS), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more busses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be processor-executable instructions for performing any portion of, or all of, the method of FIG. 3 and/or implementing any of the functionality discussed in FIGS. 1-2.

Storage 430 can be configured to store one or more elements associated with print manager 116 such as, for example, the elements discussed in FIG. 2. These elements include, but are not limited to, a component video 200, a machine learning model 202 (with corpus 204), and printing parameters 206 such as a component file 208, base material parameters 210, smart material parameters 212, nozzle parameters 214, and/or a stimulus profile 216.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any subset of the method described with respect to FIG. 3 and/or any of the functionality discussed in FIGS. 1-2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

To clarify some aspects of the present disclosure, a non-limiting list of some embodiments are now provided.

Example 1: A method comprising generating printing parameters for a deformable component; fabricating the deformable component by additive manufacturing, wherein a smart material is located at an articulation point of the deformable component, and wherein a base material is located at a static portion of the deformable component; and supplying an environmental stimulus to the deformable component that causes the deformable component to transition from a first state to a second state.

Example 2: The limitations of Example 1, wherein generating the printing parameters for the deformable component includes generating a machine learning model from a corpus of four-dimensional (4D) printing information; inputting a first video of an object undergoing deformation to the machine learning model; and receiving, from the machine learning model, the printing parameters for creating the deformable component by additive manufacturing, wherein the deformable component approximates the object undergoing deformation in the first video.

Example 3: The limitations of Example 2, wherein the method further comprises recording a second video of the deformable component transitioning from the first state to the second state; and updating the machine learning model using the second video.

Example 4: The limitations of any one of Examples 1-3 wherein the smart material comprises a shape memory polymer (SMP).

Example 5: The limitations of Example 4, wherein the environmental stimulus comprises a temperature profile of a first temperature, a first dwell time at the first temperature, a rate of change from the first temperature to a second temperature, and a second dwell time at the second temperature; and wherein the deformable component is in the first state at the first temperature and in the second state at the second temperature.

Example 6: The limitations of any one of Examples 1-5, wherein the smart material comprises a hydrogel.

Example 7: The limitations of Example 6, wherein the environmental stimulus comprises immersing the deformable component in a liquid; and wherein the deformable component is in the first state when not immersed in the liquid, and wherein the deformable component is in the second state when immersed in the liquid.

Example 8: The limitations of any one of Examples 1-7, wherein the smart material comprises a cellulose-based composite.

Example 9: The limitations of Example 8, wherein the environmental stimulus comprises a relative humidity profile of a first relative humidity, a first dwell time at the first relative humidity, a rate of change from the first relative humidity to a second relative humidity, and a second dwell time at the second relative humidity; and wherein the deformable component is in the first state at the first relative humidity and in the second state at the second relative humidity.

Example 10: A computer program product comprising a computer readable storage medium storing processor-executable program instructions therewith, wherein a processor is configured to execute the program instructions to cause the processor to perform a method according to any one of Examples 1-9.

Example 11: A system comprising a processor and a computer-readable storage medium storing processor-executable instructions. Wherein the processor is configured to execute the instructions to perform a method according to any one of Examples 1-9.

Example 12: A four-dimensional printer comprising a platform, a nozzle, and a deformation unit. Wherein the nozzle is configured to fabricate a deformable component on the platform according to printing parameters and using a smart material and a base material, wherein the smart material is located at an articulation point of the deformable component, and wherein the base material is located at a static portion of the deformable component. Wherein the deformation unit is configured to apply an environmental stimulus to the deformable component that is configured to cause the deformable component to transition from a first state to a second state.

Example 13: The limitations of Example 12, wherein the four-dimensional printer further comprises a camera proximate to the platform, wherein the camera is configured to record a first video of the deformable component transitioning from the first state to the second state.

Example 14: The limitations of Example 13, wherein the four-dimensional printer further comprises a print manager that is communicatively coupled to the nozzle and the deformation unit, wherein the print manager stores a machine learning model from a corpus of four-dimensional (4D) printing information, wherein the printing parameters are generated by inputting a second video of an object undergoing deformation to the machine learning model, and wherein the deformable component approximates the object undergoing deformation in the second video.

Example 15: The limitations of Example 14, wherein the print manager is configured to update the machine learning model using the first video of the deformable component transitioning from the first state to the second state.

Example 16: The limitations of any of Examples 12-15, wherein the smart material comprises a shape memory polymer (SMP).

Example 17: The limitations Example 16, wherein the environmental stimulus comprises a temperature profile of a first temperature, a first dwell time at the first temperature, a rate of change from the first temperature to a second temperature, and a second dwell time at the second temperature; and wherein the deformable component is in the first state at the first temperature and in the second state at the second temperature.

Example 18: The limitations of any of Examples 12-17, wherein the smart material comprises a hydrogel.

Example 19: The limitations of Example 18, wherein the environmental stimulus comprises immersing the deformable component in a liquid; and wherein the deformable component is in the first state when not immersed in the liquid, and wherein the deformable component is in the second state when immersed in the liquid.

Example 20: The limitations of any of Examples 12-19, wherein the smart material comprises a cellulose-based composite.

Example 21: The limitations of Example 20, wherein the environmental stimulus comprises a relative humidity profile of a first relative humidity, a first dwell time at the first relative humidity, a rate of change from the first relative humidity to a second relative humidity, and a second dwell time at the second relative humidity; and wherein the deformable component is in the first state at the first relative humidity and in the second state at the second relative humidity.

What is claimed is:

1. A method comprising:
   generating printing parameters for a deformable component, wherein generating the printing parameters for the deformable component includes:
   generating a machine learning model from a corpus of four-dimensional (4D) printing information;
   inputting a first video of an object undergoing deformation to the machine learning model; and
   receiving, from the machine learning model, the printing parameters for creating the deformable component by additive manufacturing, wherein the deformable component approximates the object undergoing deformation in the first video;
   fabricating the deformable component by additive manufacturing, wherein a smart material is located at an articulation point of the deformable component, and wherein a base material is located at a static portion of the deformable component; and
   supplying an environmental stimulus to the deformable component that causes the deformable component to transition from a first state to a second state.

2. The method of claim 1, further comprising:
   recording a second video of the deformable component transitioning from the first state to the second state; and
   updating the machine learning model using the second video.

3. The method of claim 1, wherein the smart material comprises a shape memory polymer (SMP).

4. The method of claim 3, wherein the environmental stimulus comprises a temperature profile of a first temperature, a first dwell time at the first temperature, a rate of change from the first temperature to a second temperature, and a second dwell time at the second temperature; and
   wherein the deformable component is in the first state at the first temperature and in the second state at the second temperature.

5. A computer program product comprising a computer readable storage medium having program instructions embodied therewith, the program instructions executable by a processor to cause the processor to perform a method comprising:

generating printing parameters for a deformable component, wherein generating the printing parameters for the deformable component includes:
        generating a machine learning model from a corpus of four-dimensional (4D) printing information;
        inputting a first video of an object undergoing deformation to the machine learning model; and
        receiving, from the machine learning model, the printing parameters for creating the deformable component by additive manufacturing, wherein the deformable component approximates the object undergoing deformation in the first video;
    fabricating the deformable component by additive manufacturing, wherein a smart material is located at an articulation point of the deformable component, and wherein a base material is located at a static portion of the deformable component; and
    supplying an environmental stimulus to the deformable component that causes the deformable component to transition from a first state to a second state.

6. The method of claim 1, wherein the printing parameters comprise a computer-aided design (CAD) model.

7. The method of claim 1, wherein the base material comprises acrylonitrile butadiene styrene (ABS).

\* \* \* \* \*